US012228980B2

(12) United States Patent
Chen et al.

(10) Patent No.: US 12,228,980 B2
(45) Date of Patent: Feb. 18, 2025

(54) MOUNTING SYSTEM FOR AN ELECTRONIC DEVICE

(71) Applicant: Quanta Computer Inc., Taoyuan (TW)

(72) Inventors: Chao-Jung Chen, Taoyuan (TW); Chih-Wei Lin, Taoyuan (TW); Yu-Nien Huang, Taoyuan (TW); Ming-Lun Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 137 days.

(21) Appl. No.: 18/117,099

(22) Filed: Mar. 3, 2023

(65) Prior Publication Data

US 2024/0192739 A1 Jun. 13, 2024

Related U.S. Application Data

(60) Provisional application No. 63/386,970, filed on Dec. 12, 2022.

(51) Int. Cl.
| | |
|---|---|
| G06F 1/18 | (2006.01) |
| B24B 47/12 | (2006.01) |
| H05K 7/20 | (2006.01) |

(52) U.S. Cl.
CPC .................................. G06F 1/185 (2013.01)

(58) Field of Classification Search
CPC .. H05K 7/20254; B24B 47/12; H01L 21/4871
See application file for complete search history.

(56) References Cited

U.S. PATENT DOCUMENTS

| | | | | |
|---|---|---|---|---|
| 2012/0039145 | A1* | 2/2012 | Samborn | B29B 7/428 |
| | | | | 476/67 |
| 2012/0096678 | A1* | 4/2012 | Zhang | G06F 1/1681 |
| | | | | 16/302 |
| 2018/0141173 | A1* | 5/2018 | Gebrehiwot | B23P 19/066 |
| 2019/0085941 | A1* | 3/2019 | Klassen | F16H 57/08 |
| 2019/0252941 | A1* | 8/2019 | Onishi | H02K 15/14 |
| 2019/0334468 | A1* | 10/2019 | Stauffer | F04D 25/08 |

* cited by examiner

*Primary Examiner* — Jermele M Hollington
*Assistant Examiner* — Temilade S Rhodes-Vivour
(74) *Attorney, Agent, or Firm* — NIXON PEABODY LLP

(57) ABSTRACT

A mounting system for an electronic device is disclosed. The mounting system includes a mounting plate; a plurality of fasteners for coupling the mounting plate with the electronic device; a single main gear mounted on the mounting plate; a plurality of secondary gears coupled, respectively, to the plurality of fasteners; and a plurality of intermediate gears mounted on the mounting plate and rotationally coupled between the single main gear and the plurality of secondary gears. Rotation of each of the plurality of secondary gears causes a fastening movement of a respective one of the plurality of fasteners. Simultaneous rotation of the plurality of intermediate gears causes the plurality of secondary gears to rotate simultaneously in response to a single rotational force being received by the main gear. The simultaneous rotation of the plurality of intermediate gears causes a simultaneous fastening movement of the plurality of secondary gears.

20 Claims, 4 Drawing Sheets

MOUNTING SYSTEM FOR AN ELECTRONIC DEVICE

CROSS-REFERENCE TO RELATED APPLICATIONS

This application claims priority from and benefit of U.S. Provisional Patent Application Ser. No. 63/386,970, filed on Dec. 12, 2022, titled "Anti-Tilt Force Balance Fastening Mechanism," which is hereby incorporated by reference herein in its entirety.

FIELD OF THE INVENTION

The present invention relates generally to a mounting system for an electronic device, and more specifically, to a fastening mechanism for the mounting system.

BACKGROUND OF THE INVENTION

Servers are specialized computer systems that include numerous electrical components integrated into a single unit using a server chassis. Common to all servers is some form of a motherboard or chipset including a central processing unit (CPU), slots for memory (e.g., DDR3, DDR4, DRAM), PCIe (Peripheral Computer Interconnect Express) slots, and connectors to other components, such as hard drives, a power supply, and peripherals (e.g., USB ports, LAN and other I/O ports). A number of these components generate heat and efficient heat extraction during use of these components is important for optimal operation of the CPU.

In recent years, thermal power of chipsets including CPU/GPU has increased significantly and chipsets usually have a bare die design with larger contact areas for contacting a heatsink or cold plate. Heat generated by a chipset must be removed by the heatsink that is attached to the surface of the heat source, i.e., chipset. As exemplified in FIG. 1, a prior art mounting system 100 includes a mounting plate 110 (heatsink or cold plate) fastened to a surface by screws, for example, 4 screws 101, 102, 103, 104. In general, each of the 4 screws 101, 102, 103, 104 is fastened sequentially in order, for example, in the order of ①, ②, ③, ④, as shown in FIG. 1, to minimize stress applied to the contact area or top surface of the chipset 200. Referring to FIG. 2, when the mounting plate or heatsink 110 is fastened to a surface with a first screw 101 first according to the method depicted in FIG. 1, a chipset 200 of a printed circuit board (PCB) 300 is stressed at a first corner near the first screw 101 fastened or being fastened. However, other corners of the chipset 200 are not yet stressed or less stressed than the first corner when only the first screw 101 has been or is being fastened. Therefore, uneven forces are applied to different corners of the chipset 200. In this case, the top surface of the chipset 200 is prone to be damaged by the uneven forces and/or stresses caused by the sequential fastening of the screws 101, 102, 103, 104.

Therefore, a need exists for a mechanism for fastening all four corners of a heatsink to a surface simultaneously to avoid generating uneven forces applied to different corners of a top surface of a chipset contacting the heatsink. A need also exists for a mechanism to more stably fastening a heatsink to a surface such that an even force can be applied simultaneously to each corner of a top surface of a chipset contacting the fastened heatsink.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In view of the above-described problem with the conventional mounting system/fastening mechanism for coupling a mounting plate, such as a heatsink or cold plate, to an electronic device, the present application discloses a mounting system with a fastening mechanism for more stably coupling a mounting plate to an electronic device.

According to certain aspects of the present disclosure, mounting system for an electronic device is disclosed. According to various embodiments, the mounting system includes a mounting plate; a plurality of fasteners for coupling the mounting plate with the electronic device; a single main gear mounted on the mounting plate; a plurality of secondary gears coupled, respectively, to the plurality of fasteners; and a plurality of intermediate gears mounted on the mounting plate and rotationally coupled between the single main gear and the plurality of secondary gears. Rotation of each of the plurality of secondary gears causes a fastening movement of a respective one of the plurality of fasteners. Simultaneous rotation of the plurality of intermediate gears causes the plurality of secondary gears to rotate simultaneously in response to a single rotational force being received by the main gear. The simultaneous rotation of the plurality of intermediate gears causes a simultaneous fastening movement of the plurality of secondary gears.

For example, the mounting plate is a heatsink or a cold plate. For example, the electronic device is a chipset.

In various embodiments, the single main gear is centrally located on the mounting plate relative to the plurality of secondary gears.

According to another aspect of the mounting system, the mounting system further includes a plurality of guide gears. In some embodiments, a pair of guide gears among the plurality of guide gears are operably engaged with a respective one of the plurality of secondary gears.

According to another aspect of the mounting system, at least the plurality of secondary gears and guide gears are spur gears. In some embodiments, each spur gear includes a cylinder or disk with teeth projecting radially. In some embodiments, all rotation axes of the plurality of secondary gears and guide gears are parallel.

According to another aspect of the mounting system, the plurality of secondary gears are raised or lowered with respect to the plurality of guide gears in response to the single rotational force being received by the main gear. In some embodiments, the plurality of guide gears are rotated simultaneously in response to the simultaneous rotation of the plurality of secondary gears.

According to another aspect of the mounting system, each of the plurality of fasteners includes external threads. In some embodiments, the external threads of the plurality of fasteners are screwed into respectively corresponding internal threads of a plurality of receiving portions in response to the simultaneous rotation of the plurality of secondary gears in a first direction. In some embodiments, the plurality of fasteners are released from the respectively corresponding receiving portions in response to the simultaneous rotation of the plurality of secondary gears in a second direction opposite the first direction. In some embodiments, a rotation direction of the plurality of secondary gears in the first direction or the second direction is determined based on a direction of the single rotational force applied to the main gear.

According to another aspect of the mounting system, a number of the plurality of secondary gears is same as or less than a number of the plurality of intermediate gears. According to another aspect of the mounting system, rotation of the main gear in a first direction causes the plurality of secondary gears to rotate simultaneously in one direction, causing fastening of the plurality of fasteners into a plurality of receiving portions configured to receive respectively corresponding fasteners. In some embodiments, rotation of the main gear in a second direction opposite the first direction causes the plurality of secondary gears to rotate simultaneously in another direction opposite the one direction. The simultaneous rotation of the plurality of secondary gears in another direction causes release of the plurality of fasteners from the respectively corresponding receiving portions.

According to another aspect of the mounting system, the main gear includes a bevel gear and the plurality of intermediate gears include a pair of first bevel gears operably engaged with the main gear. In some embodiments, the plurality of intermediate gears further include a pair of second bevel gears. In some embodiments, each of the pair of first bevel gears formed at a first end of a corresponding first shaft, and each of the pair of second bevel gears formed at a second end of the corresponding first shaft.

In some embodiments, the plurality of intermediate gears further include a pair of third bevel gears and a pair of fourth bevel gears. In some embodiments, each of the pair of second bevel gears is operably engaged with a corresponding one of the pair of third bevel gears and a corresponding one of the pair of fourth bevel gears.

In some embodiments, the third bevel gear is formed at one end of a corresponding one of a pair of second shafts and the fourth bevel gear is formed at one end of a corresponding one of a pair of third shafts. In some embodiments, the second shaft and the third shaft are aligned along a same axis. In some embodiments, the third bevel gear and the corresponding fourth bevel gear face each other.

In some embodiments, a lefthand thread of a first worm gear is cut into a portion of the second shaft and a righthand thread of a second worm gear is cut into a portion of the third shaft. In some embodiments, the first worm gear is operably engaged with a corresponding one of the plurality of secondary gears formed as worm wheels. In some embodiments, a plurality of rotation axes of the plurality of secondary gears are perpendicular to the first shafts, second shafts, and third shafts.

In some embodiments, rotation of the main gear causes the pair of first shafts to rotate. In some embodiments, the rotation of the pair of first shafts causes the pair of second shafts and pair of third shafts to rotate simultaneously. In some embodiments, the simultaneous rotation of the pair of second shafts and pair of third shafts causes the plurality of secondary gears to rotate simultaneously such that the plurality of fasteners coupled to the plurality of secondary gears are rotated simultaneously. In some embodiments, the rotated fasteners are fastened to or loosened from the electronic device based on a direction of the rotational force received by the main gear.

According to other aspects of the present disclosure, a method for mounting an electronic device is enclosed. According to various embodiments, the method includes receiving a single rotational force for rotating a main gear, the main gear being mounted on a mounting plate; in response to the rotating of the main gear, causing simultaneous rotation of a plurality of intermediate gears, the plurality of intermediate gears being physically coupled between the main gear and a plurality of secondary gears; and in response to the simultaneous rotation of the plurality of intermediate gears, causing simultaneous rotation of the plurality of secondary gears. The method further includes causing fastening of the mounting plate with the electronic device by a plurality of fasteners respectively coupled to the plurality of secondary gears in response to the simultaneous rotation of the plurality of secondary gears.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 2:
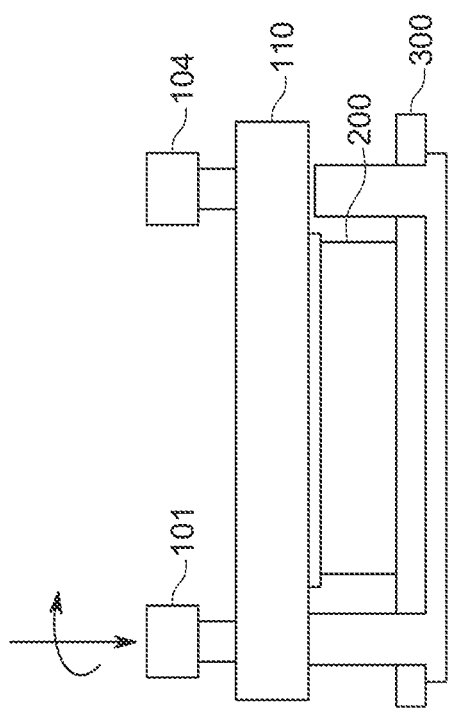
FIG. 2 is a side view of the prior art mounting system shown in FIG. 1.

Elements in the figures are illustrated for simplicity and clarity and have not necessarily been drawn to scale. For example, the dimensions and/or relative positioning of some of the elements in the figures may be exaggerated relative to other elements to help improve understanding of various features.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 3:
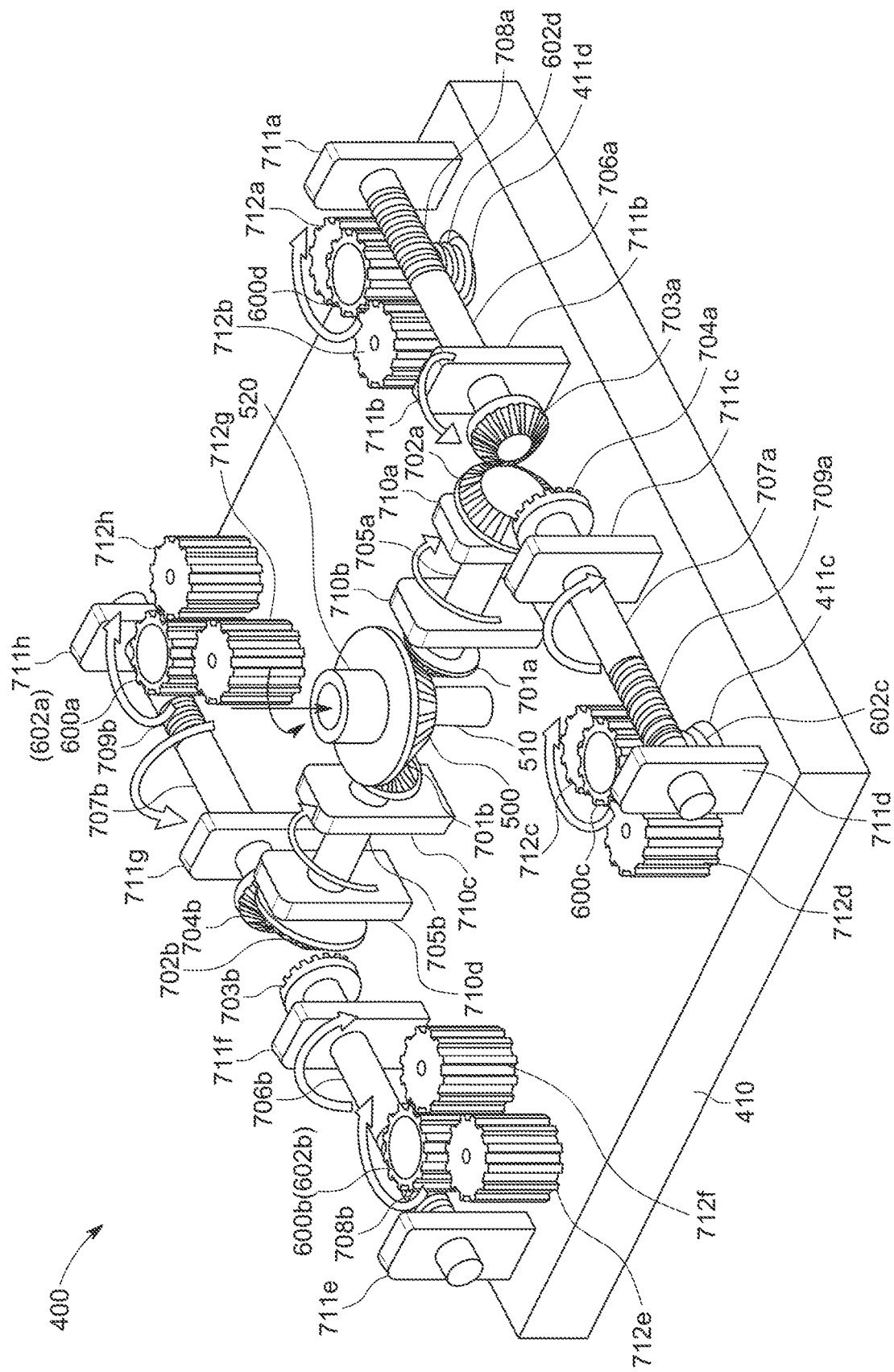
FIG. 3 is a perspective view of a mounting system for coupling a mounting plate to an electronic device, according to certain aspects of the present disclosure.

A mounting system for an electronic device according to various embodiments of the present invention is shown in FIG. 3. The mounting system 400 includes a mounting plate 410 to be coupled with an electronic device. In some embodiments, the mounting plate 410 is square or rectangular, but the shape of the mounting plate 410 is not limited thereto. For example, the mounting plate 410 is a heatsink or a cold plate. For example, the electronic device is a chipset.

The mounting system 400 further includes a plurality of fasteners 602a, 602b, 602c, 602d for coupling the mounting plate 410 with the electronic device. In some embodiments, when the mounting plate 410 is square or rectangular, each of the plurality of fasteners 602a, 602b, 602c, 602d is positioned at or near one of four corners of the mounting plate 410. In some embodiments, each of the plurality of fasteners 602a, 602b, 602c, 602d has external threads. The external threads of the plurality of fasteners 602a, 602b, 602c, 602d are configured to be screwed into respectively corresponding internal threads of a plurality of receiving portions 411a (not shown in drawings), 411b (not shown in drawings), 411c, 411d.

In some embodiments, the plurality of receiving portions 411a, 411b, 411c, 411d of the mounting plate 410 are not threaded and formed as through holes. In this case, the external threads of the plurality of fasteners 602a, 602b, 602c, 602d pass through the through holes of the plurality of receiving portions 411a, 411b, 411c, 411d and are screwed into respectively corresponding internal threads of a plurality of receiving portions formed at the electronic device.

The mounting system 400 further includes a single main gear 500 mounted on the mounting plate 410. The mounting system 400 further includes a plurality of secondary gears 600a, 600b, 600c, 600d that are coupled, respectively, to the plurality of fasteners 602a, 602b, 602c, 602d. In various embodiments, the single main gear 500 is centrally located on the mounting plate 410 relative to the plurality of secondary gears 600a, 600b, 600c, 600d. Rotation of each of the plurality of secondary gears 600a, 600b, 600c, 600d causes a fastening movement of a respective one of the plurality of fasteners 602a, 602b, 602c, 602d. The fastening movement of the plurality of fasteners 602a, 602b, 602c, 602d causes the mounting plate 410 to be coupled with the electronic device.

In some embodiments, the external threads of the plurality of fasteners 602a, 602b, 602c, 602d are screwed into respectively corresponding internal threads of a plurality of receiving portions 411a (not shown in drawings), 411b (not shown in drawings), 411c, 411d in response to the simultaneous rotation of the plurality of secondary gears 600a, 600b, 600c, 600d in a first direction. In some embodiments, the plurality of fasteners 602a, 602b, 602c, 602d are released from the respectively corresponding receiving portions 411a (not shown in drawings), 411b (not shown in drawings), 411c, 411d in response to the simultaneous rotation of the plurality of secondary gears 600a, 600b, 600c, 600d in a second direction opposite the first direction. A rotation direction of the plurality of secondary gears 600a, 600b, 600c, 600d in the first direction or the second direction is determined based on a rotation direction of the main gear 500.

Figure 1:
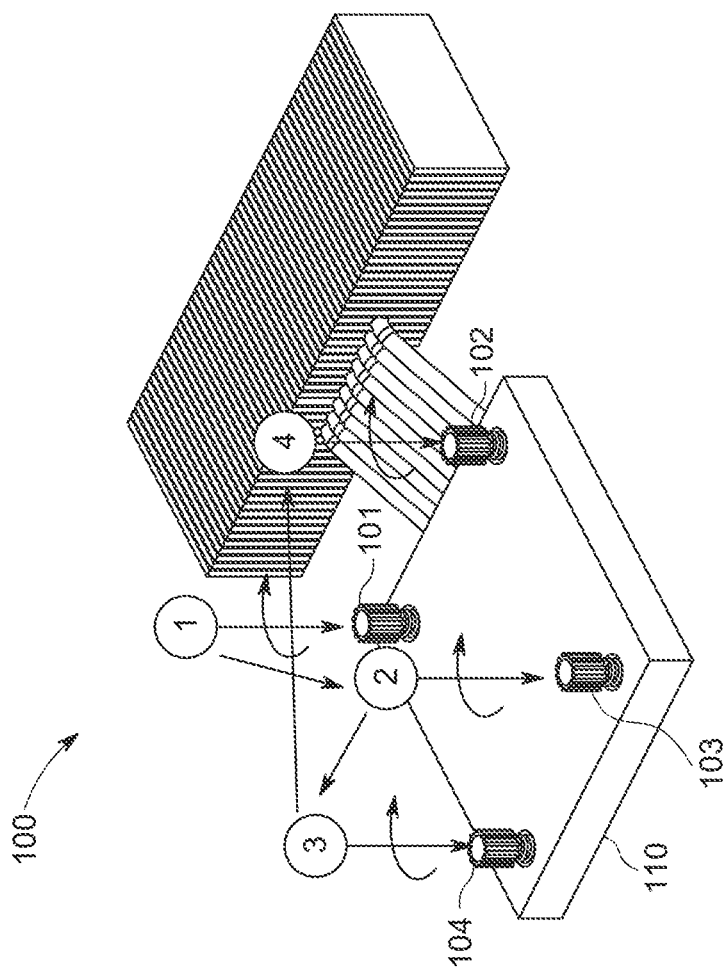
FIG. 1 is a perspective view of a prior art mounting system for coupling a mounting plate with an electronic device.

For example, a technician rotates the main gear 500 in the first direction to couple the mounting plate 410 with the electronic device. Further, the main gear 500 can be rotated in the second direction by the technician to uncouple the mounting plate 410 from the electronic device. Thus, the technician can manipulate all the fasteners 602a, 602b, 602c, 602d simultaneously by manipulating only the main gear 500 without manipulating the fasteners 602a, 602b, 602c, 602d individually. The mounting system 400 according to various embodiments of the present invention allows simultaneous fastening of all the fasteners 602a, 602b, 602c, 602d by a single force applied to the main gear 500. This fastening mechanism prevents the electronic device from being stressed at corners when each of the fasteners 602a, 602b, 602c, 602d is fastened individually in series, as exemplified in FIG. 1. That is because a fastening force is applied to all corners of the electronic device evenly when all the fasteners 602a, 602b, 602c, 602d are rotated/fastened simultaneously such that the fastening force generated by each of the fasteners 602a, 602b, 602c, 602d is balanced. The fastening mechanism of the inventive mounting system 400 is also effective to shorten the time required for installation of the mounting plate 410 since only a single rotational force is required to the main gear 500, rather than a plurality of rotations forces applied to all four fasteners 602a, 602b, 602c, 602d individually.

The mounting system 400 further includes a plurality of intermediate gears 701a, 701b, 702a, 702b, 703a, 703b, 704a, 704b, 708a, 708b, 709a, 709b mounted on the mounting plate 410. The plurality of intermediate gears 701a, 701b, 702a, 702b, 703a, 703b, 704a, 704b, 708a, 708b, 709a, 709b are rotationally coupled between the single main gear 500 and the plurality of secondary gears 600a, 600b, 600c, 600d. Simultaneous rotation of the plurality of intermediate gears 701a, 701b, 702a, 702b, 703a, 703b, 704a, 704b, 708a, 708b, 709a, 709b causes the plurality of secondary gears 600a, 600b, 600c, 600d to rotate simultaneously in response to a single rotational force being received by the main gear 500. The simultaneous rotation of the plurality of intermediate gears 701a, 701b, 702a, 702b, 703a, 703b, 704a, 704b, 708a, 708b, 709a, 709b causes a simultaneous fastening movement of the plurality of secondary gears 600a, 600b, 600c, 600d.

According to various embodiments of the present invention, the mounting system 400 further includes a plurality of guide gears 712a, 712b, 712c. 712d, 712e, 712f, 712g, 712h. As shown in FIG. 3, a pair of guide gears 712a, 712b (712c. 712d) (712e, 712f) (712g, 712h) among the plurality of guide gears 712a, 712b, 712c. 712d, 712e, 712f, 712g, 712h are operably engaged with a respective one 600d, (600c), (600b). (600a) of the plurality of secondary gears 600a, 600b. 600c, 600d. Thus, the plurality of guide gears 712a, 712b, 712c, 712d, 712e, 712f, 712g, 712h act as guide rollers that are rotated when the respective secondary gears 600a, 600b, 600c, 600d rotate. The plurality of guide gears 712a, 712b, 712c, 712d, 712e, 712f. 712g, 712h support the respective secondary gears 600a, 600b, 600c, 600d to provide stability, preventing the secondary gears 600a, 600b, 600c. 600d from tilting when they are rotated and fastened.

According to various embodiments of the present invention, the main gear 500 is formed as a bevel gear, as exemplified in FIG. 3. In some embodiments, the main bevel gear 500 is coupled to a shaft 510 coupled with the mounting plate 410. In some embodiments, a handle 520 is coupled to or protrudes from the main gear 500. A technician can apply a rotational force to the main gear 500 by manipulating the handle 520 with a hand or a tool.

According to various embodiments, the plurality of intermediate gears includes a pair of first bevel gears 701a, 701b operably engaged with the main gear 500. The plurality of intermediate gears further includes a pair of second bevel gears 702a, 702b. Each of the pair of first bevel gears 701a, 701b is formed at a first end of a respective first shaft 705a, 705b, and each of the pair of second bevel gears 702a, 702b is formed at a second end of the respective first shaft 705a, 705b. The first shaft 705a is held by a pair of supporting structures 710a, 710b and the first shaft 705b is held by a pair of supporting structures 710c, 710d.

According to various embodiments, the plurality of intermediate gears further includes a pair of third bevel gears 703a, 703b and a pair of fourth bevel gears 704a, 704b. Each of the pair of second bevel gears 702a, 702b is operably engaged with a respective one of the pair of third bevel gears 703a, 703b and a respective one of the pair of fourth bevel gears 704a, 704b. The third bevel gear 703a, 703b is formed at one end of a respective one of a pair of second shafts 706a, 706b and the fourth bevel gear 704a, 704b is formed at one end of a respective one of a pair of third shafts 707a, 707b. The second shaft 706a and the third shaft 707a are aligned along a same axis, and the second shaft 706b and the third shaft 707b are aligned along a same axis. The third bevel gear 703a, 703b and the corresponding fourth bevel gear 704a, 704b face each other. The second shaft 706a is held by a pair of supporting structures 711a, 711b, and the second shaft 706b is held by a pair of supporting structures 711e, 711f. The third shaft 707a is held by a pair of supporting structures 711c. 711d, and the third shaft 707b is held by a pair of supporting structures 711g, 711h. Each of the supporting structures 710a, 710b, 710c, 710d, 711a. 711b, 711c, 711d, 711e, 711f, 711g, 711h is coupled to the top surface of the mounting plate 410 and has a through hole into which a respective shaft 705a, 705b, 706a, 706b, 707a, 707b is inserted.

According to various embodiments, a lefthand thread of a first worm gear 708a, 708b is cut into a portion of the second shaft 706a, 706b, respectively, and a righthand thread of a second worm gear 709a, 709b is cut into a portion of the third shaft 707a, 707b, respectively. The first worm gear 708a, 708b is operably engaged with a respective one of the plurality of secondary gears 600d, 600b formed as worm wheels. The second worm gear 709a, 709b is operably engaged with a corresponding one of the plurality of secondary gears 600c, 600a formed as worm wheels. A plurality of rotation axes of the plurality of secondary gears 600a, 600b, 600c, 600d are perpendicular to the first shafts 705a, 705b, second shafts 706a, 706b, and third shafts 707a, 707b.

As exemplified in FIG. 3, in the mounting system 400, rotation of the main gear 500 causes the pair of first shafts 705a, 705b to rotate. Then, the rotation of the pair of first shafts 705a, 705b causes the pair of second shafts 706a, 706b and pair of third shafts 707a, 707b to rotate simultaneously. Then, the simultaneous rotation of the pair of second shafts 706a, 706b and pair of third shafts 707a, 707b causes the plurality of secondary gears 600a, 600b, 600c, 600d to rotate simultaneously such that the plurality of fasteners coupled to the plurality of secondary gears are rotated simultaneously. Then, the rotated fasteners 602a, 602b, 602c, 602d are fastened to or loosened from the electronic device based on a direction of the rotational force received by the main gear 500.

Although a number of gears are included in the inventive mounting system 400 exemplified in FIG. 3, rotation of the main gear 500 in a first direction causes the plurality of secondary gears 600a, 600b, 600c, 600d to rotate simultaneously in one direction. The simultaneous rotation of the plurality of secondary gears 600a, 600b, 600c, 600d in the one direction causes fastening of the plurality of fasteners 602a, 602b, 602c, 602d into the plurality of receiving portions 411a, 411b, 411c, 411d configured to receive respectively corresponding fasteners 602a, 602b, 602c, 602d.

Further, rotation of the main gear 500 in a second direction opposite the first direction causes the plurality of secondary gears 600a, 600b, 600c, 600d to rotate simultaneously in another direction opposite the one direction. The simultaneous rotation of the plurality of secondary gears 600a, 600b, 600c, 600d in another direction opposite the one direction causes release of the plurality of fasteners 602a, 602b, 602c, 602d from the respectively corresponding receiving portions 411a, 411b, 411c, 411d of the mounting plate 410.

Figure 4:
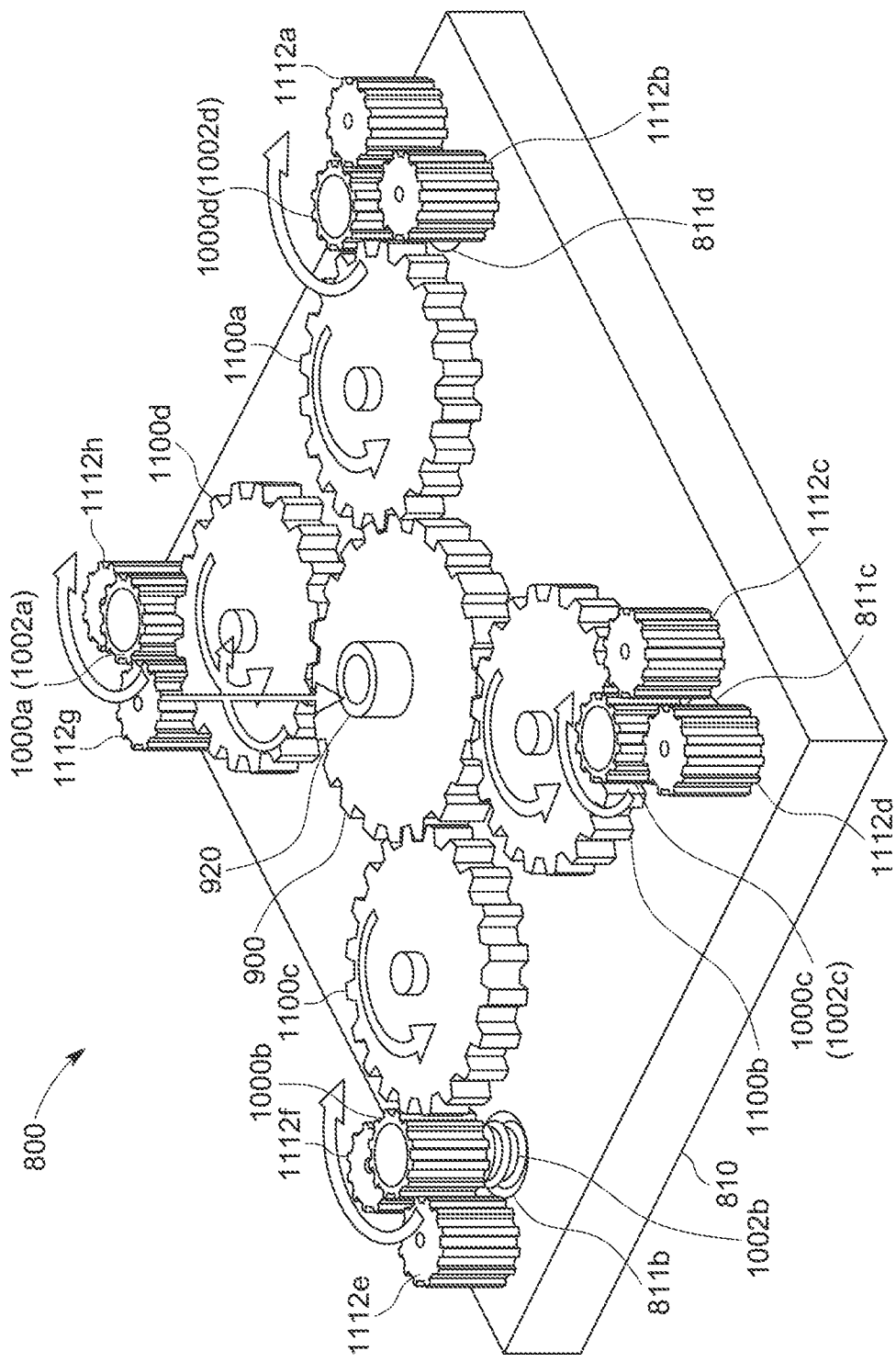
FIG. 4 is a perspective view of a mounting system for coupling a mounting plate to an electronic device, according to certain aspects of the present disclosure.

A mounting system for an electronic device according to various embodiments of the present invention is shown in FIG. 4. The mounting system 800 includes a mounting plate 810 to be coupled with an electronic device. In some embodiments, the mounting plate 810 is square or rectangular, but the shape of the mounting plate 810 is not limited thereto. For example, the mounting plate 810 is a heatsink or a cold plate. For example, the electronic device is a chipset.

The mounting system 800 further includes a plurality of fasteners 1002a, 1002b, 1002c, 1002d for coupling the mounting plate 810 with the electronic device. In some embodiments, when the mounting plate 810 is square or rectangular, each of the plurality of fasteners 1002a, 1002b, 1002c, 1002d is positioned at or near one of four corners of the mounting plate 810. In some embodiments, each of the plurality of fasteners 1002a, 1002b, 1002c, 1002d has external threads. The external threads of the plurality of fasteners 1002a, 1002b, 1002c, 1002d are configured to be screwed into respectively corresponding internal threads of a plurality of receiving portions 811a (not shown in drawings), 8116, 811c, 811d.

In some embodiments, the plurality of receiving portions 811a, 811b, 811c, 811d of the mounting plate 810 are not threaded and formed as through holes. In this case, the external threads of the plurality of fasteners 1002a. 1002b, 1002c, 1002d pass through the through holes of the plurality of receiving portions 811a, 811b, 811c, 811d and are screwed into respectively corresponding internal threads of a plurality of receiving portions formed at the electronic device.

The mounting system 800 further includes a single main gear 900 mounted on the mounting plate 810. The mounting system 800 further includes a plurality of secondary gears 1000a, 1000b, 1000c, 1000d that are coupled, respectively, to the plurality of fasteners 1002a, 1002b, 1002c, 1002d. In various embodiments, the single main gear 900 is centrally located on the mounting plate 810 relative to the plurality of secondary gears 1000a, 1000b, 1000c, 1000d. Rotation of each of the plurality of secondary gears 1000a, 1000b, 1000c, 1000d causes a fastening movement of a respective one of the plurality of fasteners 1002a, 1002b, 1002c, 1002d. The fastening movement of the plurality of fasteners 1002a, 1002b, 1002c, 1002d causes the mounting plate 810 to be coupled with the electronic device.

In some embodiments, the external threads of the plurality of fasteners 1002a, 1002b. 1002c, 1002d are screwed into respectively corresponding internal threads of a plurality of receiving portions 811a (not shown in drawings), 811b, 811c, 811d in response to the simultaneous rotation of the plurality of secondary gears 1000a. 1000b, 1000c, 1000d in a first direction. In some embodiments, the plurality of fasteners 1002a, 1002b, 1002c, 1002d are released from the respectively corresponding receiving portions 811a (not shown in drawings). 811b, 811c. 811d in response to the simultaneous rotation of the plurality of secondary gears 1000a, 1000b, 1000c, 1000d in a second direction opposite the first direction. A rotation direction of the plurality of secondary gears 1000a, 1000b, 1000c, 1000d in the first direction or the second direction is determined based on a rotation direction of the main gear 900.

For example, a technician rotates the main gear 900 in the first direction to couple the mounting plate 810 with the electronic device. Further, the main gear 900 can be rotated in the second direction by the technician to uncouple the mounting plate 810 from the electronic device. Thus, the technician can manipulate all the fasteners 1002a, 1002b, 1002c, 1002d simultaneously by manipulating only the main gear 900 without manipulating the fasteners 1002a, 1002b, 1002c, 1002d individually. The mounting system 800 according to various embodiments of the present invention allows simultaneous fastening of all the fasteners 1002a, 1002b, 1002c, 1002d by a single force applied to the main gear 900. This fastening mechanism prevents the electronic device from being stressed at corners when each of the fasteners 1002a, 1002b, 1002c, 1002d is fastened individually in series, as exemplified in FIG. 1. That is because a fastening force is applied to all corners of the electronic device evenly when all the fasteners 1002a, 1002b, 1002c, 1002d are rotated/fastened simultaneously such that the fastening force generated by each of the fasteners 1002a, 1002b, 1002c, 1002d is balanced. The fastening mechanism of the inventive mounting system 800 is also effective to shorten the time required for installation of the mounting plate 810 since only a single rotational force is required to the main gear 900, rather than a plurality of rotations forces applied to all four fasteners 1002a, 1002b, 1002c, 1002d individually.

The mounting system 800 further includes a plurality of intermediate gears 1100a, 1100b, 1100c, 1100d mounted on the mounting plate 810. The plurality of intermediate gears 1100a, 1100b, 1100c, 1100d are rotationally coupled between the single main gear 900 and the plurality of secondary gears 1000a, 1000b, 1000c, 1000d. Simultaneous rotation of the plurality of intermediate gears 1100a. 1100b, 1100c, 1100d causes the plurality of secondary gears 1000a. 1000b, 1000c, 1000d to rotate simultaneously in response to a single rotational force being received by the main gear 900. The simultaneous rotation of the plurality of intermediate gears 1100a, 1100b, 1100c, 1100d causes a simultaneous fastening movement of the plurality of secondary gears 1000a, 1000b, 1000c, 1000d.

According to various embodiments of the present invention, the mounting system 800 further includes a plurality of guide gears 1112a, 1112b, 1112c, 1112d, 1112e, 1112f, 1112g, 1112h. As shown in FIG. 4, a pair of guide gears 1112a, 1112b, (1112c, 1112d), (1112e, 1112f), (1112g, 1112h) among the plurality of guide gears are operably engaged with a respective one 1000a, (1000b), (1000c), (1000d) of the plurality of secondary gears. Thus, the plurality of guide gears 1112a, 1112b, 1112c, 1112d, 1112e, 1112f, 1112g, 1112h act as guide rollers that are rotated when the respective secondary gears 1000a, 1000b, 1000c, 1000d rotate. The plurality of guide gears 1112a, 1112b, 1112c, 1112d, 1112e, 1112f, 1112g, 1112h support the respective secondary gears 1000a, 1000b, 1000c, 1000d to provide stability, preventing the secondary gears 1000a, 1000b, 1000c, 1000d from tilting when they are rotated and fastened.

According to various embodiments of the present invention, the main gear 900, secondary gears 1000a, 1000b, 1000c, 1000d, intermediate gears 1100a, 1100b, 1100c, 1100d, and guide gears 1112a, 1112b, 1112c, 1112d, 1112e, 1112f, 1112g, 1112h are spur gears. Each spur gear is formed as a cylinder or disk with teeth projecting radially. All rotation axes of the main gear 900, secondary gears 1000a, 1000b, 1000c, 1000d, intermediate gears 1100a, 1100b, 1100c, 1100d, and guide gears 1112a, 11126, 1112c, 1112d, 1112e, 1112f, 1112g, 1112h are parallel and formed vertically with respect to the top surface of the mounting plate 810. In some embodiments, the main gear 900 is coupled to the mounting plate 810. In some embodiments, a handle 920 is coupled to or protrudes from the main gear 900. A technician can apply a rotational force to the main gear 900 by manipulating the handle 920 with a hand or a tool.

According to various embodiments, the plurality of secondary gears 1000a, 1000b, 1000c, 1000d are raised or lowered with respect to the plurality of guide gears 1112a, 1112b, 1112c, 1112d, 1112e, 1112f, 1112g, 1112h in response to the single rotational force being received by the main gear 900. The plurality of guide gears 1112a, 1112b, 1112c, 1112d, 1112e, 1112f, 1112g, 1112h are rotated simultaneously in response to the simultaneous rotation of the plurality of secondary gears 1000a, 1000b, 1000c, 1000d. In some embodiments, a number of the plurality of secondary gears 1000a, 1000b, 1000c, 1000d is same as a number of the plurality of intermediate gears 1100a, 1100b, 1100c, 1100d.

As exemplified in FIG. 4, in the mounting system 800, rotation of the main gear 900 causes the intermediate gears 1100a, 1100b, 1100c, 1100d to rotate. Then, the rotation of the intermediate gears 1100a, 1100b, 1100c, 1100d causes the plurality of secondary gears 1000a, 1000b, 1000c, 1000d to rotate simultaneously. At the same time, the plurality of fasteners 1002a, 1002b, 1002c, 1002d coupled to the plurality of secondary gears 1000a, 1000b, 1000c, 1000d are rotated simultaneously. The simultaneous rotation of the plurality of secondary gears 1000a, 1000b, 1000c, 1000d causes the plurality of guide gears 1112a, 1112b, 1112c, 1112d, 1112e, 1112f, 1112g, 1112h to rotate. Then, the rotated fasteners 1002a, 1002b, 1002c, 1002d are fastened to or loosened from the electronic device based on a direction of the rotational force received by the main gear 900.

In the mounting system 800, the direction of the rotation of the main gear 900 is same as a direction of the rotation of the plurality of secondary gears 1000a, 1000b, 1000c, 1000d. Further, a direction of the rotation of the intermediate gears 1100a, 1100b, 1100c, 1100d is opposite to the direction of the rotation of the main gear 900. For example, the direction of the rotation of the intermediate gears 1100a, 1100b, 1100c, 1100d is counterclockwise when the directions of the rotation of the main gear 900 and secondary gears 1000a, 1000b, 1000c, 1000d are clockwise. Further, the direction of the rotation of the intermediate gears 1100a, 1100b, 1100c, 1100d is clockwise when the directions of the rotation of the main gear 900 and secondary gears 1000a. 1000b, 1000c, 1000d are counterclockwise.

For example, rotation of the main gear 900 in a first direction causes the plurality of secondary gears 1000a, 1000b, 1000c, 1000d to rotate simultaneously in one direction. The simultaneous rotation of the plurality of secondary gears 1000a, 1000b, 1000c, 1000d in the one direction causes fastening of the plurality of fasteners 1002a, 1002b, 1002c, 1002d into the plurality of receiving portions 811a, 811b, 811c, 811d configured to receive respectively corresponding fasteners 1002a, 1002b, 1002c. 1002d.

Further, rotation of the main gear 900 in a second direction opposite the first direction causes the plurality of secondary gears 1000a, 1000b, 1000c, 1000d to rotate simultaneously in another direction opposite the one direction. The simultaneous rotation of the plurality of secondary gears 1000a, 1000b, 1000c, 1000d in another direction opposite the one direction causes release of the plurality of fasteners 1002a, 1002b, 1002c, 1002d from the respectively corresponding receiving portions 811a, 811b, 811c, 811d of the mounting plate 810.

Referring to FIGS. 3 and 4, a method for mounting an electronic device with the mounting system 400 or 800 includes receiving a single rotational force for rotating the main gear 500 or 900 mounted on the mounting plate 410 or 810. In response to the rotating of the main gear 500 or 900, the plurality of intermediate gears intermediate gears 701a, 701b, 702a, 702b, 703a, 703b, 704a, 704b, 708a, 708b, 709a, 709b (or 1100a, 1100b, 1100c, 1100d) rotate simultaneously. The plurality of intermediate gears 701a, 701b, 702a, 702b, 703a, 703b, 704a, 704b, 708a, 708b, 709a, 709b (or 1100a, 1100b, 1100c, 1100d) are physically coupled between the main gear 500 or 900 and the plurality of secondary gears 600a, 600b, 600c, 600d (or 1000a, 1000b, 1000c, 1000d). In response to the simultaneous rotation of the plurality of intermediate gears 701a, 701b, 702a, 702b, 703a, 703b, 704a, 704b, 708a, 708b, 709a, 709b (or 1100a, 1100b, 1100c, 1100d), the plurality of secondary gears rotate simultaneously. In response to the simultaneous rotation of the plurality of secondary gears 600a, 600b, 600c, 600d (or 1000a, 1000b, 1000c, 1000d), the mounting plate 410 or 810 is fastened with the electronic device by the plurality of fasteners 602a, 602b, 602c, 602d (or 1002a, 1002b, 1002c, 1002d) respectively coupled to the plurality of secondary gears 600a, 600b, 600c, 600d (or 1000a, 1000b, 1000c, 1000d). Thus, in the method, the only operation performed by a technician to couple the mounting plate 410 or 810 to the electronic device is applying a single rotational force for rotating the main gear 500 or 900. The single rotation force applied to the main gear 500 or 900 causes simultaneous rotation of the plurality of intermediate gears 701a, 701b, 702a, 702b, 703a, 703b, 704a, 704b, 708a, 708b, 709a, 709b (or 1100a, 1100b, 1100c, 1100d) and secondary gears 600a, 600b, 600c, 600d (or 1000a, 1000b, 1000c, 1000d), at the same time, causing fastening of the mounting plate 410 or 810 with the electronic device by the plurality of fasteners 602a, 602b, 602c, 602d (or 1002a, 1002b, 1002c, 1002d).

Figure 6:
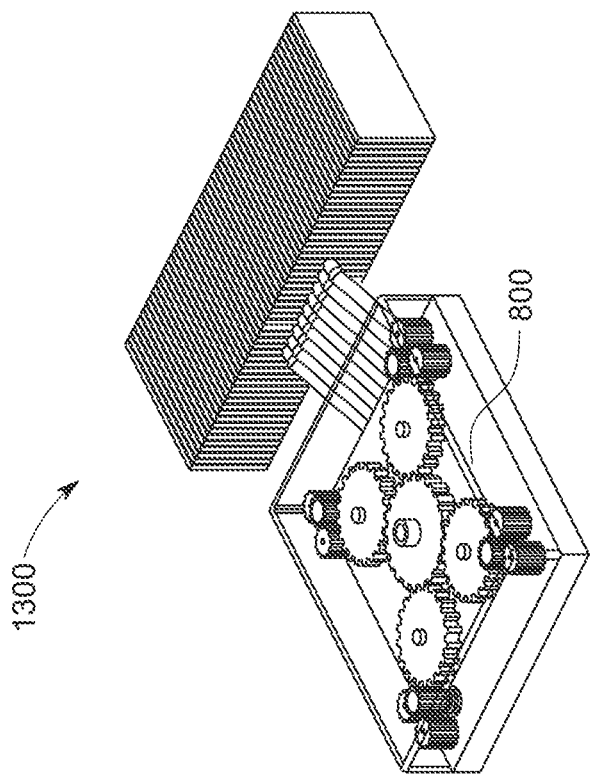
FIG. 6 is a perspective view of a cooling system including the mounting system shown in FIG. 4, according to certain aspects of the present disclosure.
Figure 5:
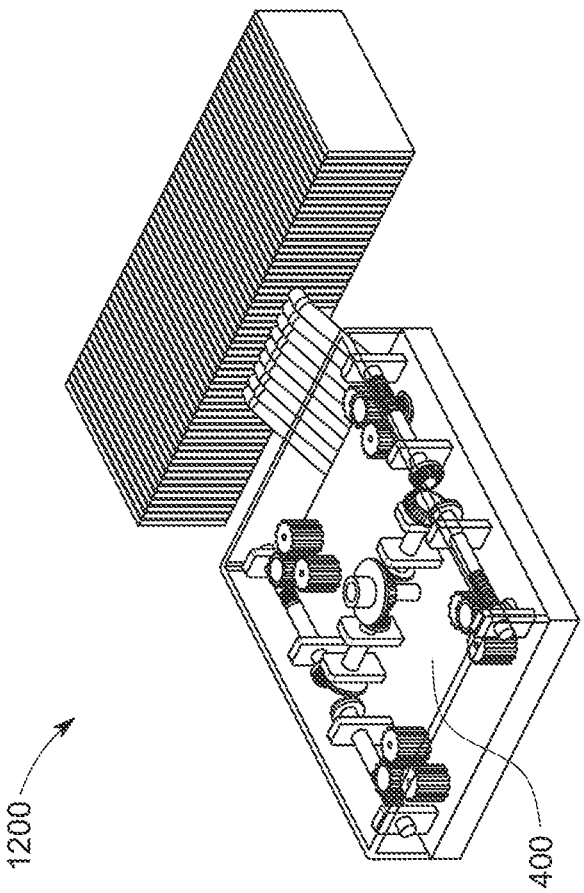
FIG. 5 is a perspective view of a cooling system including the mounting system shown in FIG. 3, according to certain aspects of the present disclosure.

FIG. 5 shows a cooling system 1200 of an electronic device including the mounting system 400 exemplified in FIG. 3. FIG. 6 shows a cooling system 1300 of an electronic device including the mounting system 800 exemplified in FIG. 4. The mounting systems 400, 800 can be implemented in various cooling systems including an air cooling system and a liquid cooling system in which a contact force between the mounting plate 410, 810 and the surface of the electronic device needs to be balanced.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A mounting system for an electronic device, the mounting system comprising:
    a mounting plate that is square or rectangular;
    a plurality of fasteners for coupling the mounting plate with the electronic device, wherein a number of the plurality of fasteners is four and each of the plurality of fasteners is positioned at or near one of four corners of the mounting plate;
    a single main gear mounted on the mounting plate;
    a plurality of secondary gears coupled, respectively, to the plurality of fasteners, rotation of each of the plurality of secondary gears causing a fastening movement of a respective one of the plurality of fasteners; and
    a plurality of intermediate gears mounted on the mounting plate and rotationally coupled between the single main gear and the plurality of secondary gears, simultaneous rotation of the plurality of intermediate gears causing the plurality of secondary gears to rotate simultaneously in response to a single rotational force being received by the main gear, the simultaneous rotation of the plurality of intermediate gears causing a simultaneous fastening movement of the plurality of secondary gears,
    wherein the single main gear is centrally located on the mounting plate relative to the plurality of secondary gears.

2. The mounting system of claim 1, wherein the mounting plate is a heatsink or a cold plate.

3. The mounting system of claim 1, wherein the electronic device is a chipset.

4. The mounting system of claim 1, further comprising a plurality of guide gears, a pair of guide gears among the plurality of guide gears operably engaged with a respective one of the plurality of secondary gears.

5. The mounting system of claim 4, wherein at least the plurality of secondary gears and guide gears are spur gears, each spur gear comprising a cylinder or disk with teeth projecting radially, and all rotation axes of the plurality of secondary gears and guide gears are parallel.

6. The mounting system of claim 4, wherein the plurality of secondary gears are raised or lowered with respect to the plurality of guide gears in response to the single rotational force being received by the main gear, and the plurality of guide gears are rotated simultaneously in response to the simultaneous rotation of the plurality of secondary gears.

7. The mounting system of claim 1, wherein:
    each of the plurality of fasteners comprises external threads;
    the external threads of the plurality of fasteners are screwed into respectively corresponding internal threads of a plurality of receiving portions in response to the simultaneous rotation of the plurality of secondary gears in a first direction;
    the plurality of fasteners are released from the respectively corresponding receiving portions in response to the simultaneous rotation of the plurality of secondary gears in a second direction opposite the first direction; and
    a rotation direction of the plurality of secondary gears in the first direction or the second direction is determined based on a direction of the single rotational force applied to the main gear.

8. The mounting system of claim 1, wherein a number of the plurality of secondary gears is same as or less than a number of the plurality of intermediate gears.

9. The mounting system of claim 1, wherein rotation of the main gear in a first direction causes the plurality of secondary gears to rotate simultaneously in one direction, causing fastening of the plurality of fasteners into a plurality of receiving portions configured to receive respectively corresponding fasteners.

10. The mounting system of claim 9, wherein rotation of the main gear in a second direction opposite the first direction causes the plurality of secondary gears to rotate simultaneously in another direction opposite the one direction, causing release of the plurality of fasteners from the respectively corresponding receiving portions.

11. A mounting system for an electronic device, the mounting system comprising:
    a mounting plate;
    a plurality of fasteners for coupling the mounting plate with the electronic device;
    a single main gear mounted on the mounting plate, wherein the main gear comprises a bevel gear;
    a plurality of secondary gears coupled, respectively, to the plurality of fasteners, rotation of each of the plurality of secondary gears causing a fastening movement of a respective one of the plurality of fasteners; and
    a plurality of intermediate gears mounted on the mounting plate and rotationally coupled between the single main gear and the plurality of secondary gears, simultaneous rotation of the plurality of intermediate gears causing the plurality of secondary gears to rotate simultaneously in response to a single rotational force being received by the main gear, the simultaneous rotation of the plurality of intermediate gears causing a simultaneous fastening movement of the plurality of secondary gears, wherein the plurality of intermediate gears comprise a pair of first bevel gears operably engaged with the main gear.

12. The mounting system of claim 11, wherein the plurality of intermediate gears further comprise a pair of second bevel gears, each of the pair of first bevel gears formed at a first end of a corresponding first shaft, and each of the pair of second bevel gears formed at a second end of the corresponding first shaft.

13. The mounting system of claim 12, wherein the plurality of intermediate gears further comprise a pair of third bevel gears and a pair of fourth bevel gears, each of the pair of second bevel gears is operably engaged with a corresponding one of the pair of third bevel gears and a corresponding one of the pair of fourth bevel gears.

14. The mounting system of claim 13, wherein the third bevel gear is formed at one end of a corresponding one of a pair of second shafts and the fourth bevel gear is formed at one end of a corresponding one of a pair of third shafts, the second shaft and the third shaft aligned along a same axis, and the third bevel gear and the corresponding fourth bevel gear facing each other.

15. The mounting system of claim 14, wherein rotation of the main gear causes the pair of first shafts to rotate, the rotation of the pair of first shafts causing the pair of second shafts and pair of third shafts to rotate simultaneously, and the simultaneous rotation of the pair of second shafts and pair of third shafts causing the plurality of secondary gears to rotate simultaneously such that the plurality of fasteners coupled to the plurality of secondary gears are rotated simultaneously, the rotated fasteners fastened to or loosened from the electronic device based on a direction of the rotational force received by the main gear.

16. The mounting system of claim 14, wherein a lefthand thread of a first worm gear is cut into a portion of the second shaft and a righthand thread of a second worm gear is cut into a portion of the third shaft.

17. The mounting system of claim 16, wherein the first worm gear is operably engaged with a corresponding one of the plurality of secondary gears formed as worm wheels.

18. The mounting system of claim 17, wherein a plurality of rotation axes of the plurality of secondary gears are perpendicular to the first shafts, second shafts, and third shafts.

19. A method for mounting an electronic device by a mounting system, the method comprising:
   receiving a single rotational force for rotating a main gear, the main gear being mounted on a mounting plate that is square or rectangular;
   in response to the rotating of the main gear, causing simultaneous rotation of a plurality of intermediate gears, the plurality of intermediate gears being physically coupled between the main gear and a plurality of secondary gears;
   in response to the simultaneous rotation of the plurality of intermediate gears, causing simultaneous rotation of the plurality of secondary gears; and
   in response to the simultaneous rotation of the plurality of secondary gears, causing fastening of the mounting plate with the electronic device by a plurality of fasteners respectively coupled to the plurality of secondary gears,
   wherein a number of the plurality of fasteners is four and each of the plurality of fasteners is positioned at or near one of four corners of the mounting plate, and
   wherein the plurality of fasteners comprises external threads inserted into respectively corresponding internal threads of a plurality of receiving portions formed on the mounting plate.

20. A mounting system for an electronic device, the mounting system comprising:
   a mounting plate;
   a plurality of fasteners for coupling the mounting plate with the electronic device;
   a single main gear mounted on the mounting plate;
   a plurality of secondary gears coupled, respectively, to the plurality of fasteners, rotation of each of the plurality of secondary gears causing a fastening movement of a respective one of the plurality of fasteners; and
   a plurality of intermediate gears mounted on the mounting plate and rotationally coupled between the single main gear and the plurality of secondary gears, simultaneous rotation of the plurality of intermediate gears causing the plurality of secondary gears to rotate simultaneously in response to a single rotational force being received by the main gear, the simultaneous rotation of the plurality of intermediate gears causing a simultaneous fastening movement of the plurality of secondary gears,
   wherein the plurality of fasteners comprises external threads inserted into respectively corresponding internal threads of a plurality of receiving portions formed on the mounting plate.

\* \* \* \* \*